Patented Nov. 3, 1942

2,301,143

UNITED STATES PATENT OFFICE 2,301,143

METHOD OF INCREASING PRODUCTION IN THE GRINDING OF PIGMENT PASTES

Leo Roon, South Orange, and Arthur Minich, Roselle, N. J., assignors to Nuodex Products Co., Inc., Elizabeth, N. J., a corporation of New York No Drawing. Application October 31, 1939, Serial No. 302,118

2 Claims. (Cl. 260—767)

This invention relates to the making of pigment pastes as such or for use in the manufacture of paints, undercoaters, primers, putties, enamels, lacquers, inks, linoleums, etc., and the object of the invention is to increase mill output of the pastes during the grinding thereof, without sacrifice of fineness of the pigment particles.

We have for a long time been engaged in experimentation and research to find some way to attain this object, for in many instances in the arts to which we have referred, certain pastes ground very slowly and required long periods of mill operation in order to produce the pastes desired. This condition has prevailed on even the most up-to-date mills and although the best minds of the industry have long been engaged with this problem, no satisfactory solution has heretofore been suggested.

Inasmuch as every known manner of mill operation and adjustment had failed to solve the problem, we turned our attention to the possibility of adding some agent to the batch to be treated in the hope of finding a material that would reduce the grinding time.

We tried many kinds of material in this connection, but met with failure. We finally discovered that the difficulty did not lie in either the apparatus alone or in the paste constituents alone, but in the failure of all of these to properly cooperate. Satisfactory results were finally accomplished after we discovered that, in order for the mill to function with highest efficiency, the material operated upon must be in such condition as to translate the grinding energy into the useful work of separating the pigment agglomerates into particles of the requisite fineness.

Experimenting with friable masses, we found that the breaking up thereof could best be accomplished by immobilizing them, while force was applied to them, but it was only after much fruitless research that we discovered that certain organic polymers, when added to a batch of pigment-vehicle system to be ground, would so immobilize the pigment agglomerates that the grinding energy of a mill could operate thereon to the best advantage.

Among the polymers with which we worked was rubber, both natural and synthetic. We knew that rubber had heretofore been used in the making of paint, etc., and that so-called rubber paints had from time to time appeared on the market. They had not, however, found favor with the trade in general. Paint men had used rubber in the hope of increasing the waterproofing, brushing qualities and non-settling properties of their paints, but in every instance such rubber had changed the character of the paint and in most cases the results had been far from satisfactory. Moreover, paint manufacturers had large numbers of formulas for their various products, which formulas had fully stood the test of time in actual use and we knew very well that no such manufacturer would re-formulate his products with the consequent risk of failures in performance of the ultimate coating. We therefore realized that if we would employ rubber for our purposes, we would have to use it in such small quantities that it would not materially change or alter the composition of the resulting product. Consequently, in testing rubber for our purposes, we used such small quantities thereof as not to materially change the end product. We placed in a pony mixer a quantity of pigment, a suitable quantity of an appropriate vehicle, and a crepe rubber solution of very small quantity. The pony mixer was then started and run until these materials were thoroughly mixed. We then fed the resulting mixture to a conventional roller mill to test the performance as against the performance of the same mill upon the same pigment-vehicle system without the rubber present. We found that there was no appreciable difference in the output. This general procedure has been since carried out again and again with invariably the same results, viz., failure to perform the purposes of this invention.

We subsequently discovered, however, that it was possible to use this same quantity of rubber with wholly unexpected results if the procedure of compounding the batch were changed. That is to say the pigment and the vehicle should first be brought together and thoroughly mixed and, after the pigment-vehicle system had thus been uniformly incorporated, the rubber solution should then be added and stirred in without undue mixing, and the resulting batch then fed to the mill. When this procedure was followed tests showed that the step-up in production was very marked. Our research showed that, when the rubber solution in the batch was subjected to prolonged mixing operations, its usefulness for stepping up grinding production was impaired. We found that this could be offset in a measure by using larger quantities of rubber solution but that great care had to be exercised, so that not sufficient rubber was added to materially affect the composition of the end product for this would effect formulation and render problematical the durability, permanency and performance of the ultimate coating or other product. Thorough tests in connection with the present invention have demonstrated that between 1/10 of 1% and 1% of rubber, based on the total weight of the paste, will yield a marked step-up in production if the rubber is incorporated after the pigment-vehicle system batch has been mixed and before grinding the same, whereas the benefit is decreased if such rubber is subjected to the prolonged mixing required to condition such pigment-vehicle system for milling. In rare cases, as where the rubber is to be subjected to prolonged mixing with the pigment-vehicle system, the amount of rubber used may run as high as 2% or 2½%, based on the weight of the paste, but greater amounts should not be used.

We have found that viscosity plays an important part in the carrying out of this invention. If the viscosity of the rubber solution employed is too low, little or no advantage is obtainable through its use. The particular pigment and vehicle with which the solution is to be used will determine the lower viscosity limit to some extent, but our experience has shown the minimum limit of viscosity for practical results to be 50 centipoises at 25° C., although higher levels are generally conducive to better results. The maximum viscosity limit is that the rubber solution is preferably sufficiently mobile to permit of distribution in the paste to be ground. These limits apply to all examples hereinafter given and constitute an important part of the present invention.

We have especially referred to the use of rubber. We have used and tested in this connection both natural and artificial rubber, including balata gum which is of the rubber family and isobutylene polymers which are illustrative of one type of synthetic rubber. Rubber, as referred to in the appended claims, is to be understood as including both natural and synthetic or artificial rubber and equivalent polymers. We have found that the rubber, to be useful in the method of this invention, must be xylol-soluble, so that it may be placed in solution in an appropriate solvent for use as stated. Vulcanized rubber, as such, will not function.

The following examples are illustrative of the procedure of preparing the rubber for use in the method of this invention.

Example I 50 pounds of crepe rubber are introduced into 450 pounds of high-flash-naphtha. The mixture is agitated and maintanied at about 200° F. in a vacuum kettle. It is desirable to inject, during the operation, a small quantity of an inert gas, such as nitrogen, so as to minimize oxidation.

After all the rubber has dissolved, there is added sufficient high-flash-naphtha for the replacement of the evaporated solvent. The viscosity of the resulting product was 90 seconds at 25° C. on a Gardner mobilometer with a four hole disc and a 1000 gram weight. The yield produced was 500 pounds of a rubber solution containing 10% solids.

Example II 100 parts of an isobutylene polymer having a molecular weight of approximately 14,200 is dissolved in 300 parts of xylol, to yield a solution carrying 25% total solids. The resulting product had a viscosity of 200 seconds at 25° C. (same Gardner mobilometer).

Example III

| | Pounds |
|---|---|
| Precipitated balata gum | 300 |
| Toluol | 1200 |
| Total yield of a 20% solution | 1500 |

The viscosity was 60 seconds at 25° C. (same Gardner mobilometer).

Example IV

Proceed as in Example III but use "Solvesso 2" instead of toluol, in the same quantities.

Example V 50 pounds of smoked rubber and 50 pounds of precipitated balata gum are introduced into 567 pounds of xylol. The mixture is agitated and maintained at about 150° F. in a vacuum kettle, preferably with an inert gas.

After all the rubber is dissolved, there is added sufficient xylol to yield 667 pounds of solution carrying approximately 15% solids and having a viscosity of 120 seconds at 25° C. (same Gardner mobilometer).

Example VI 250 pounds of crepe rubber are introduced into 250 pounds of "Solvesso 2." The same procedure is followed as in Example V to yield 500 pounds of a 50% solution having a viscosity of 150 seconds at 25° C. (same Gardner mobilometer).

It will be noted that the various examples given specify compositions having a wide range of total solids. It is not our intention, however, to limit the composition of this invention to any particular percentage of total solids. The controlling factor is that there be sufficient solids present to yield a minimum viscosity of 50 centipoises.

In the foregoing examples we have referred to certain illustrative solvents—xylol, high-flash-naphtha, toluol and "Solvesso 2," but other appropriate organic solvents may be used in our method. A solvent to be appropriate for use in this invention must be a solvent for the rubber used and must be compatible with the vehicle of the paste with which it is to be employed. A wide variety of solvents may be employed and they may be either volatile or non-volatile.

The rubber solutions prepared as described gave excellent results in speeding up the making of pigment pastes, when they were added to the pigment-vehicle system after it had been mixed and before feeding it to the grinding mill. The following examples are illustrative of actual practice.

Example VII.—White enamel paste

| | Grams |
|---|---|
| Titanium dioxide | 650 |
| Estergum varnish (60% total solids) | 350 |

After mixing the above ingredients to a uniform paste, .8% (based on the total weight of the paste) of composition of Example VI was added thereto and the mass was fed to a laboratory type 3 roll mill. It was found that the mill output was increased by 38% over and above that which prevailed when no composition was employed.

Example VIII.—Red enamel paste

| | Grams |
|---|---|
| Para red | 430 |
| Phenolic varnish (carrying 50% total solids) | 570 |

When, to the mixture of the above ingredients .8% of the composition of Example VI was added, it was observed that the mill output was increased by 32%.

*Example IX.—Green enamel paste*

| | Grams |
|---|---|
| Chrome green | 600 |
| Phenolic varnish (carrying 60% total solids) | 400 |

After thoroughly mixing the pigment and vehicle, 1% of the composition of Example V was distributed therein and the mixture subjected to grinding on a roller mill. It was noted that the mill output increased by approximately 30%.

*Example X.—White house paint*

| | Grams |
|---|---|
| Leaded zinc | 247 |
| Asbestine | 66 |
| Titanium dioxide | 87 |
| White lead | 384 |
| Bodied perilla oil | 25 |
| Raw linseed oil | 205 |

After mixing of the above ingredients to a uniform paste, 1½% of the composition of Example VI was introduced. When the mixture was fed to a laboratory type 3 roll mill, it is noted that the mill output was increased by 35%.

*Example XI.—Burnt umber in oil*

| | Grams |
|---|---|
| Burnt umber | 170 |
| Iron oxide | 3 |
| Carbon black | 3 |
| Raw soya bean oil | 62 |
| Raw linseed oil | 62 |

After mixing of the above ingredients to a fairly uniform paste, .6% of the composition of Example V was introduced therein. When the resultant mass was ground on a Buhrstone mill, it was learned that the mill output was increased by 40%.

*Example XII.—Primer for steel*

| | Grams |
|---|---|
| Red iron oxide | 116 |
| China clay | 178 |
| Alkyd resin solution of 50% total solids | 156 |
| Xylol | 50 |

After having mixed the above ingredients to a fairly uniform mass, 1% of the composition of Example VI was distributed therein and the mass was then ground on a roller mill. It was noted that the mill output was increased by 28%.

*Example XIII.—White paste for lacquer*

| | Grams |
|---|---|
| Titanium dioxide | 420 |
| Blown castor oil | 180 |
| Butylcellosolve | 60 |

When 1½% of the composition of Example VI is added and the whole mass ground on a roller mill, it was noted that the mill output was increased by 34%.

*Example XIV.—Pigmented paste for lacquer*

| | Grams |
|---|---|
| Titanium dioxide | 130 |
| Dibutylphthalate | 84 |
| Shellac solution 8 lb. cut | 8 |

To the above ingredients 2% of the composition of Example VI is added. When this mass was ground on a roller mill, it was observed that the mill output was increased by 19%.

*Example XV.—News inks*

| | Grams |
|---|---|
| Carbon black | 25 |
| Resin varnish | 5 |
| Gilsonite varnish | 5 |
| Methyl violet toner solution | 2½ |
| News ink-oil | 212½ |

When, to the above ingredients, 4% of the composition of Example VI was added and the mass subjected to grinding on a three roll mill, an increase of 40% in mill output over and above what normally prevails was the result.

*Example XVI.—Chrome green in oil*

Commingle 600 gms. chrome green, 500 gms. raw linseed oil and 2% of the composition of Example VI in any desired sequence. The mass, when subjected to grinding on a roller mill, produced an increase in mill output of 41%.

In the foregoing examples, we have referred to the employment of the composition of Examples V and VI as used in various connections. It will be understood, however, that we may use the compositions of the other examples in like manner, due care being exercised in the selection of such compositions as will be appropriate to the pigment-vehicle system in which they are to be used.

We have found from the foregoing examples, as well as numerous other tests which have been made, that the use of rubber solutions, as described, having a viscosity of at least 50 centipoises will, when added to a pigment paste to be ground, materially facilitate and expedite the grinding operation and produce a pronounced step-up in production. We have given definite proportions in the foregoing examples, but a study of these proportions has shown that they are susceptible to variation within reasonable limits without departing from this invention.

The invention is operated with high efficiency in connection with the grinding of pastes including a wide range of vehicles, such as oils, resins, varnishes and plasticizers, and the resulting products have been uniformly thoroughly satisfactory. The end products of the examples which we have given, and many others of which we are aware, do not differ, to all intents and purposes, from like end products made without the use of rubber. They are not rubber products in any sense as the quantity of rubber used during their production is so small as not to appreciably change the character of the product, except that, the better grinding thus obtained tends to produce a finer division of the pigment.

In the examples which we have given, it will be noted that the addition of small quantities of the rubber solution to the batch immediately speeded up production and in other cases and in other tests which were made accompanying adjustment of the mill to lesser clearances produced an increased output with greater fineness of pigment particles in the finished paste.

Having thus fully described the invention, what we claim as new and desire to secure by Letters Patent is:

1. The herein described method of speeding up the making of pigment pastes, which comprises sufficiently mixing a pigment with a liquid vehicle to prepare the resulting pigment-vehicle system for milling, thereafter adding thereto, without appreciable additional mixing, a solution of xylol-soluble rubber free from wetting agents and having a viscosity of not less than 50 centipoises and in an amount not exceeding 1% based on the total weight of the resulting mass, and thereafter milling said mass.

2. The herein described method of speeding up the making of pigment pastes, which comprises sufficiently mixing a pigment with a liquid vehicle to prepare the resulting pigment-vehicle system for milling, thereafter adding thereto, without appreciable additional mixing, a solution of xylol-soluble rubber free from wetting agents and having a viscosity of not less than 50 centipoises and in an amount not exceeding 2½% based on the total weight of the resulting mass, and thereafter milling said mass.

LEO ROON.
ARTHUR MINICH.